(12) United States Patent
Tarantino

(10) Patent No.: US 10,893,661 B2
(45) Date of Patent: Jan. 19, 2021

(54) ENVIRONMENTALLY AWARE PET LEASH

(71) Applicant: Jenna L. Tarantino, Raleigh, NC (US)

(72) Inventor: Jenna L. Tarantino, Raleigh, NC (US)

( * ) Notice: Subject to any disclaimer, the term of this patent is extended or adjusted under 35 U.S.C. 154(b) by 175 days.

(21) Appl. No.: 16/276,197

(22) Filed: Feb. 14, 2019

(65) Prior Publication Data
US 2020/0260692 A1    Aug. 20, 2020

(51) Int. Cl.
*A01K 27/00* (2006.01)
*G01J 5/00* (2006.01)
*G01J 5/02* (2006.01)

(52) U.S. Cl.
CPC .......... *A01K 27/006* (2013.01); *A01K 27/004* (2013.01); *A01K 27/009* (2013.01); *G01J 5/0003* (2013.01); *G01J 5/0265* (2013.01)

(58) Field of Classification Search
CPC ... A01K 27/006; A01K 27/004; A01K 27/009
See application file for complete search history.

(56) References Cited

U.S. PATENT DOCUMENTS

| 10,602,722 | B1 * | 3/2020 | Hetzer | A01K 27/003 |
| 2009/0183691 | A1 * | 7/2009 | Hassan | A01K 27/006 |
| | | | | 119/796 |
| 2016/0015004 | A1 * | 1/2016 | Bonge, Jr. | G16H 40/63 |
| | | | | 119/718 |
| 2017/0083018 | A1 * | 3/2017 | Womble | E01H 1/006 |
| 2018/0184621 | A1 * | 7/2018 | Trevino | A01K 27/004 |
| 2018/0340833 | A1 * | 11/2018 | Liang | G01J 5/021 |
| 2018/0366776 | A1 * | 12/2018 | Kerem | A61B 5/1112 |
| 2019/0154512 | A1 * | 5/2019 | Frank | G01J 5/20 |
| 2020/0245590 | A1 * | 8/2020 | Hill | G06K 7/10178 |

* cited by examiner

*Primary Examiner* — Magdalena Topolski
*Assistant Examiner* — Katelyn T Truong
(74) *Attorney, Agent, or Firm* — John L. Sotomayor

(57) ABSTRACT

In embodiments, the environmentally aware pet leash may restrain the movements of a pet and monitor environmental conditions during a walk. An infrared thermometer within the pet leash may be pointed towards a walking surface in front of the pet. The pet leash may display the pavement temperature of the walking surface, on an operator display and may alert the use to pavement temperatures that lie outside of predetermined range of temperatures. A laser point that is aligned to display a visible spot at the center of the area may show the user where the pavement temperature is being determined. The pet leash may also display and alert based upon data from a plurality of environmental sensors and a distance/route tracker and may report environmental conditions, alerts, distances, or routes to a remote computer using a transceiver.

6 Claims, 8 Drawing Sheets

ENVIRONMENTALLY AWARE PET LEASH

CROSS-REFERENCE TO RELATED APPLICATION

This application claims the benefit of U.S. Provisional Application No. 62/631,265, filed Feb. 15, 2018 and entitled "NOVEL DEVICE HAVING A TEMPERATURE SURFACE SENSOR WITH CONTEXTUALLY-OR ENVIRONMENTALLY-DEPENDENT DISPLAY", which is incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Walking a pet on a leash may be an enjoyable experience for both the pet and the pet owner. However, a risk exists that the pet may be exposed to unhealthy, unsafe, or uncomfortable conditions and circumstances during the walk. As non-limiting examples, the temperature of pavement that is exposed to direct sunlight may rise to the point where the pet's paws may be burned if the pet walks on the pavement. A time-constrained pet owner may utilize a pet walking service and may be concerned that a hired pet-walker may walk the pet too far or too fast or that the hired pet-walker may not adjust the walk based upon environmental conditions such as ambient air temperature or relative humidity. In addition, the pet-walking service may find it beneficial to monitor environmental condition, walking distance, and routes.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
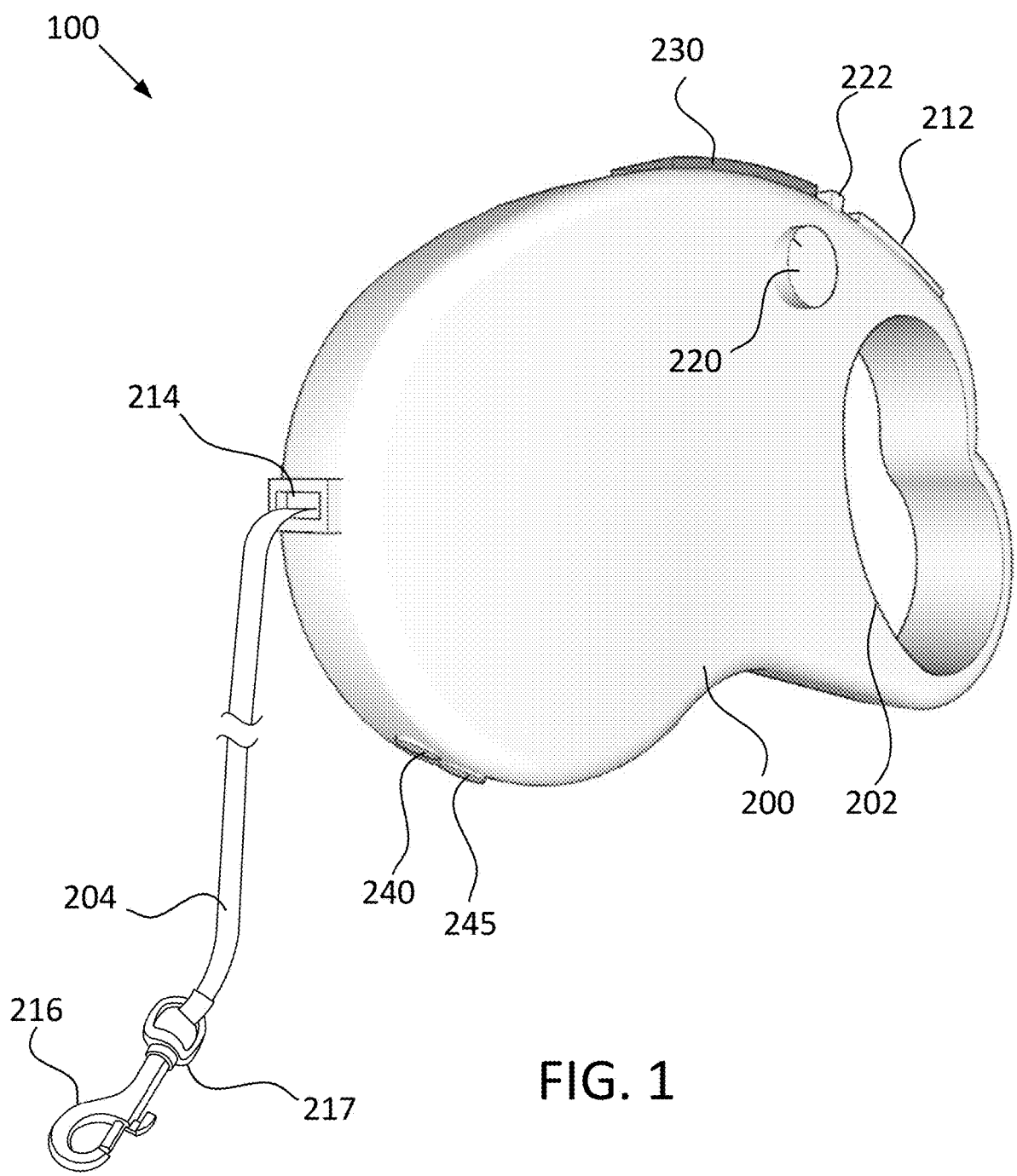
FIG. 1 is a perspective view of an environmentally aware pet leash consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, an "axle" is a cylindrical shaft that is inserted through the center of an object such that the center axis of the object and the center axis of the axle are aligned and the object can rotate using the axle as an axis of rotation.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "bolt" is a cylindrical shaft that is formed with an exterior screw thread. A bolt is defined with an outer diameter.

As used in this disclosure, a "brake" is a device that is used to slow or stop the motion of a machine or a vehicle.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used herein, the words "data" and "information" are used interchangeably to refer to raw, unprocessed facts and to facts that have been processed, structured, organized, or presented in a context that makes the facts useful.

As used in this disclosure, a "display" is a surface upon which is presented an image, potentially including, but not limited to, graphic images and text, that is interpretable by an individual viewing the image. When used as a verb, "display" is defined as presenting such an image.

As used herein, "energize" and/or "energization" refer to the application of an electrical potential to a system or subsystem.

As used in this disclosure, "flexible" refers to an object or material which will deform when a force is applied to it, which will not return to its original shape when the deforming force is removed, and which may not retain the deformed shape caused by the deforming force.

As used herein, "front" indicates the side of an object that is closest to a forward direction of travel under normal use of the object or the side or part of an object that normally presents itself to view or that is normally used first. "Rear" or "back" refers to the side that is opposite the front.

As used herein, "GPS" refers to a device that uses signals received from a system of navigational satellites to determine the position of the device. GPS is an acronym for Global Positioning System.

As used in this disclosure, a "housing" is a rigid casing that encloses and protects one or more devices.

As used in this disclosure, the word "lateral" refers to the sides of an object or movement towards a side. Lateral directions are generally perpendicular to longitudinal directions. "Laterally" refers to movement in a lateral direction.

As used in this disclosure, "LCD" is an acronym for Liquid Crystal Display. A liquid crystal display comprises a liquid crystal film placed between two sheets of transparent material. The visual characteristics of the LCD can be varied through the application of a voltage.

As used in this disclosure, an "LED" is an acronym for a light emitting diode. An LED allows current to flow in one direction and when current is flowing the LED emits photons. The wavelength of the light that is emitted may be in the visible range of the spectrum or may extend into either the infrared (IR) spectral range or the ultraviolet (UV) spectral range. The brightness of the LED can be increased and decreased by controlling the amount of current flowing through the LED. Multiple LEDs having different emission spectrums may be packaged into a single device to produce a multi-color LED. A broad range of colors may be produced by multi-color LEDs by selecting which of the multiple LEDs are energized and by controlling the brightness of each of the multiple LEDs. Organic LEDs (OLEDs) are included in this definition.

As used in this disclosure, a "network" refers to a data communication or data exchange structure where data is electronically transferred between nodes, also known as terminals, which are electrically attached to the network. In common usage, the operator of the network is often used as an adjective to describe the network. As a non-limiting example, a telecommunication network may refer to a network run by a telecommunication organization while a banking network may refer to a network operated by an organization involved in banking.

As used herein, the terms "processor", "central processor", "central processing unit", "CPU", or "microprocessor" refer to a digital device that carries out the instructions comprising a computer program by performing basic arithmetic, logical, control, and input/output operations. The term "microprocessor" may additionally imply a level of miniaturization and power reduction that makes the device suitable for portable or battery operated systems.

As used in this disclosure, a "screen" is a meshed structure made of wire, yarn, cloth, synthetic materials, or combinations thereof that allows for the free flow of air but prevents larger objects from passing through the meshed structure.

As used in this disclosure, a "sensor" is a device that quantitatively measures a physical stimulus.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure a "strap" is a strip of leather, cloth, nylon, plastic, thin metal, rubber, or other flexible material, that is used to fasten, secure, carry, or hold onto something. A strap is sometimes used in conjunction with a buckle.

As used in this disclosure, a "switch" is an electrical device that starts and stops the flow of electricity through an electric circuit by completing or interrupting an electric circuit. The act of completing or interrupting the electrical circuit may be called actuation. Completing or interrupting an electric circuit with a switch is often referred to as closing or opening a switch, respectively. Completing or interrupting an electric circuit is also referred to as making or breaking the circuit, respectively.

As used in this disclosure, a "torsion spring" is a mechanical device that stores mechanical energy through an opposing torque when the mechanical device is twisted. The torsion spring will return to its original relaxed shape when the twisting force is removed.

As used in this disclosure, a "transceiver" is a device that is used to transmit and/or receive signals. The signals may be audible, optical, or RF in nature.

As used in this disclosure, a "transducer" is a device that converts a physical quantity, such as pressure or brightness into an electrical signal or a device that converts an electrical signal into a physical quantity.

As used in this disclosure, "WiFi" refers to the physical implementation of a collection of wireless electronic communication standards commonly referred to as IEEE 802.11x and used for wireless communication between devices.

As used in this disclosure, "wireless" is an adjective that is used to describe a communication channel that does not require the use of physical cabling.

The environmentally aware pet leash (hereinafter invention) may comprise a housing, a strap, a snap hook, control electronics, an operator display, a laser pointer, and an infrared thermometer. The invention is a pet leash that may monitor environmental conditions during a walk. The invention may be adapted to alert a user if the environmental conditions are unsafe, unhealthy, or uncomfortable. As non-limiting examples, the environmental conditions may be considered unsafe, unhealthy, or uncomfortable if a pavement temperature is outside of a pavement temperature range, if an ambient air temperature is outside of an ambient air temperature range, if an ambient relative humidity is outside of an ambient relative humidity range, if a travel distance exceeds a maximum travel distance, or if a walking speed exceeds a maximum walking speed.

The housing may comprise a grip, a spool, a spring, a brake, a brake handle, a strap aperture, a power control, a laser control, a backlight control, a units control, and one or more batteries. The housing may be an enclosure for the spool, the laser pointer, the infrared thermometer, the operator display, the power control, the laser control, the units control, the backlight control, the control electronics, and the one or more batteries. The housing may be adapted to be held by the user during the walk, with the strap extending from the front of the housing to the snap hook. The spool may be located in the front half of the housing so that the strap may feed to and from the spool through the strap aperture at the front of the housing. The laser pointer and the infrared thermometer may be located on the lower front of the housing in a position where they may shine onto the pavement in front of a pet. The operator display, the laser control, the backlight control, and the units control may be located on the top of the housing where they may be seen and accessed by the user. The brake handle may also be located on the top of the housing and may be used to activate the brake that is adjacent to the spool. The power control may be located on the side of the housing.

The grip may be an aperture that passes through the housing from side-to-side. The grip may be adapted to be held by the user to reduce the likelihood that the housing will slip from the hand of the user.

The spool may be a reel around which the strap is wrapped and unwrapped. The spool may rotate on an axle that is disposed laterally within the housing such that the spool is free to rotate on the axle when the pet pulls the strap out of the housing.

The spring may function to rotate the spool in a first direction such that the spool pulls the strap into the housing. As a non-limiting example, the spring may be a torsion spring which is coupled at one end to the spool and is coupled at the other end to the housing or to the axle.

The brake may prevent the spool from rotating when the brake is engaged and may allow the spool to rotate when the brake is disengaged. The brake may be engaged or disengaged using the brake handle. User interactions with the brake handle may be conveyed to the brake via a brake coupling.

The power control may apply or remove an electrical potential delivered by the one or more batteries to the control electronics. In some embodiments, the power control may provide a volume level input that determines the volume level of sounds played through an audio transducer. In some embodiments, auxiliary power may reach the control electronics without passing through the power control. The auxiliary power may allow a real time clock to track time while the power control is in the OFF position.

The laser control may energize the laser pointer when activated and may deenergize the laser pointer when deactivated. Each depression of the laser control may cause the laser control to toggle between activated and deactivated. The backlight control may energize a backlight of the operator display when activated and may deenergize the backlight of the operator display when deactivated. Each depression of the backlight control may cause the backlight control to toggle between activated and deactivated. The units control may cause the operator display to switch between using metric units and English units when reporting distances, temperatures, or other measurements. Each depression of the units control may cause the operator display to toggle between metric and English units.

The one or more batteries may comprise one or more energy-storage devices. The one or more batteries may be a source of electrical energy to operate the laser pointer, the infrared thermometer, the operator display, and the control electronics. The one or more batteries may be replaceable or rechargeable.

The strap may be a flexible tether that restricts the movement of the pet. The strap may be coupled at one end to the spool and at the other end to the snap hook. The strap may be wound around the spool within the housing when not in use. The strap may be wound around the spool when the spool rotates in the first direction under the influence of the spring. The strap may be extended from the housing by pulling on the snap hook. As the strap is deployed from the housing, the strap may unwind from the spool and may cause the spool to rotate in a second direction thus increasing torsion on the spring.

The snap hook may couple the strap to a pet collar. As a non-limiting example, the snap hook may be a bolt snap. In some embodiments, the snap hook may comprise a swivel that allows the snap hook to rotate as the pet moves around.

The control electronics may control the operation of the laser pointer, the infrared thermometer, the operator display, the backlight, and the audio transducer. The control electronics may monitor the laser control, may energize the laser pointer when the laser control is activated, and may deenergize the laser pointer when the laser control is deactivated. The control electronics may monitor the backlight control, may energize the backlight when the backlight control is activated, and may deenergize the backlight when the backlight control is deactivated. The control electronics may comprise the real time clock. The real time clock may track the time of day and may be used to time intervals. The control electronics may receive a time of day from the real time clock, may form a time of day message that includes the time of day, and may display the time of day message on the operator display.

The control electronics may receive the pavement temperature from the infrared thermometer, may form a pavement temperature message that includes the pavement temperature, and may display the pavement temperature message on the operator display.

The control electronics may comprise a plurality of environmental sensors that produce environmental measurements. As non-limiting examples, the plurality of environmental sensors may comprise an ambient temperature sensor and an ambient relative humidity sensor and the environmental measurements may comprise the ambient air temperature and the ambient relative humidity. The control electronics may form environmental messages that include the environmental measurements and may display the environmental messages on the operator display. As non-limiting examples, the environmental messages may comprise an ambient temperature message and an ambient relative humidity message.

The control electronics may receive the ambient air temperature from the ambient temperature sensor, may form the ambient temperature message that includes the ambient air temperature, and may display the ambient temperature message on the operator display. The control electronics may receive the ambient relative humidity from the ambient relative humidity sensor, may form the ambient relative humidity message that includes the ambient relative humidity, and may display the ambient relative humidity message on the operator display. In some embodiments, the control electronics may monitor the level of the one or more batteries via a battery monitor. The battery monitor may determine what percentage of the battery charge is remaining. As a non-limiting example, the battery monitor may monitor the voltage level of the one or more batteries to determine percentage of the battery charge that is remaining. The control electronics may receive a battery charge level from the battery monitor, may form a battery charge level message that includes the battery charge level, and may display the battery charge level message on the operator display. The control electronics may repeat these measurements at a predefined interval so that the operator display is continuously updated while the power control is turned to the ON position. All messages may be textual, graphical, or a combination thereof.

In some embodiments, the control electronics may comprise a tracker. The tracker may determine the distance that the control electronics, and therefore the pet, has travelled. As a non-limiting example, the tracker may be a pedometer. In some embodiments, the tracker may be a global positioning system receiver, in which case the control electronics may be able to determine the location of the invention using spatial coordinates.

The control electronics may determine a walk duration and the travel distance. As a non-limiting example, the walk duration may be determined by subtracting the current time of day from the time of day when the power control was turned to the ON position or by reading an interval timer. The travel distance may be determined from the tracker—either by reading the travel distance from the tracker directly or by computing the distance between a starting location and the current location. The control electronics may compute the walking speed as the travel distance divided by the walk duration. The walking speed may be computed as an average speed, an instantaneous speed, or both. Average speed may be computed using the total time and distance of the walk while instantaneous speed may be computed using a subset of the time and distance. The control electronics may determine the travel distance, may form a travel distance message that includes the travel distance, and may display the travel distance message on the operator display. The control electronics may compute the walking speed, may form a walking speed message that includes the walking speed, and may display the walking speed message on the operator display.

The control electronics may detect and report an alert condition. The alert condition may occur whenever a parameter measured by the control electronics is above a predetermined upper threshold, below a predetermined lower threshold, or outside of a predetermined range of thresholds. As non-limiting examples, the alert condition may occur if the pavement temperature is outside of the pavement temperature range, if the ambient air temperature is outside of the ambient air temperature range, if the ambient relative humidity is outside of the ambient relative humidity range, if the travel distance exceeds the maximum travel distance, or if the walking speed exceeds the maximum walking speed. If the alert condition occurs, the control electronics may attempt to notify the user. As non-limiting examples, the control electronics may change the text, graphics, or attributes of messages on the operator display and/or may play an audible indication via the audio transducer. The audible indication may be a tone, a sequence of tones, a pre-recorded audio clip, or a combination thereof.

In some embodiments, the control electronics may comprise a microprocessor, a memory, and one or more I/O ports. The microprocessor may be a computer processor that incorporates the functions of a central processing unit in the form of one or more integrated circuits. The microprocessor may be a multipurpose, clock driven, register based, digital-integrated circuit. The microprocessor may accept binary data as input, process it according to instructions stored in the memory, and provide results as output. The microprocessor may contain both combinational logic and sequential digital logic. The microprocessor may operate on numbers and symbols represented in the binary numeral system. The memory may comprise one or more electronic circuits that store information for immediate use by a computer or other digital electronics. The memory may comprise connections allowing a subset of the memory to be addressed, connections to read or write the subset of the memory, and connections to control the reading and writing of the subset of the memory. The memory may be directly or indirectly coupled to the microprocessor, which may read and write the content of the memory. The memory may be categorized as SRAM, DRAM, ROM, PROM, EPROM, EEROM, Flash NVRAM, or other designations based upon characteristics of the memory. In some embodiments, the memory may comprise combinations of these memory designations. As non-limiting examples, characteristics of the memory may include the need to be refreshed in order to retain its contents, the ability to retain its contents when power is removed, the ability to change contents that have been programmed into the memory, or combinations thereof. At least a portion of the memory may be used to store a program. The program may be a set of instructions that control the operation of the microprocessor. Specifically, the instructions of the program may control the sequence and timing of the laser pointer, the infrared thermometer, the battery monitor, the tracker, the real time clock, the ambient temperature sensor, and the ambient relative humidity sensor.

The operator display may be a flat viewing screen that presents text and/or images as a change of contrast or color. The determination of what text and/or images to display is made by the control electronics. As non-limiting examples, the operator display may be LCD technology, LED technology, OLED technology, plasma technology, or other flat-panel display technologies. The operator display may comprise the backlight which is a panel behind the display surface of the operator display. The backlight may be illuminated to improve visibility of the operator display at night.

The laser pointer may produce a laser beam of visible coherent light when energized. The laser pointer may be aligned with the infrared thermometer such that the laser beam produces a visible spot on a walking surface where the infrared thermometer is aimed. As a non-limiting example, the walking surface may be the pavement in front of the pet. The visible spot may be located at the center of a temperature measurement area where the infrared thermometer is measuring the pavement temperature. Thus, the laser pointer may provide the user with a visual indication of the temperature measurement area where the pavement temperature is being measured.

The infrared thermometer may measure the temperature of a remote object located in front of the infrared thermometer within the temperature measurement area. The infrared thermometer may be used to measure the pavement temperature of the pavement in front of the pet.

In some embodiments, the invention may communicate with a remote computer via a transceiver located on the control electronics. As non-limiting examples, the remote computer may be a desktop computer, a server, a laptop, tablet, a smart watch, or other computing platform. The control electronics may exchange wireless messages with the remote computer. As non-limiting examples, the transceiver may communicate wirelessly using Bluetooth, BLE, WiFi, cellular, Zigbee, LoRa, narrowband, or other communication protocols. The wireless messages may be exchanged directly with the remote computer or via a network that is located in the path between the transceiver and the remote computer. Software running on the remote computer may collect information regarding the walk, may determine the current location of the pet, may monitor the alert conditions that occur during the walk, or combinations thereof. The collected information may include the walk duration, the travel distance, and the environmental conditions during the walk. In circumstances where the pet is being walked by a business that provides a pet walking service, the pet owner may use the collected information to monitor the walk and the business may use the information to improve their service, to provide protection from liability issues, or to identify when intervention is necessary and then take action.

Turning now to FIG. 1, this figure depicts the housing 200 with the grip 202, the strap aperture 214 at the front of the housing 200 with the strap 204 emerging from the strap aperture 214, and the snap hook 216 coupled to the strap 204 by the swivel 217. The laser pointer 240 and the infrared thermometer 245 are shown on the front bottom of the housing 200. The power control 220 is shown on the left side of the housing 200 and the operator display 230, the laser control 222, and the brake handle 212 are visible on the top of the housing 200.

Figure 2:
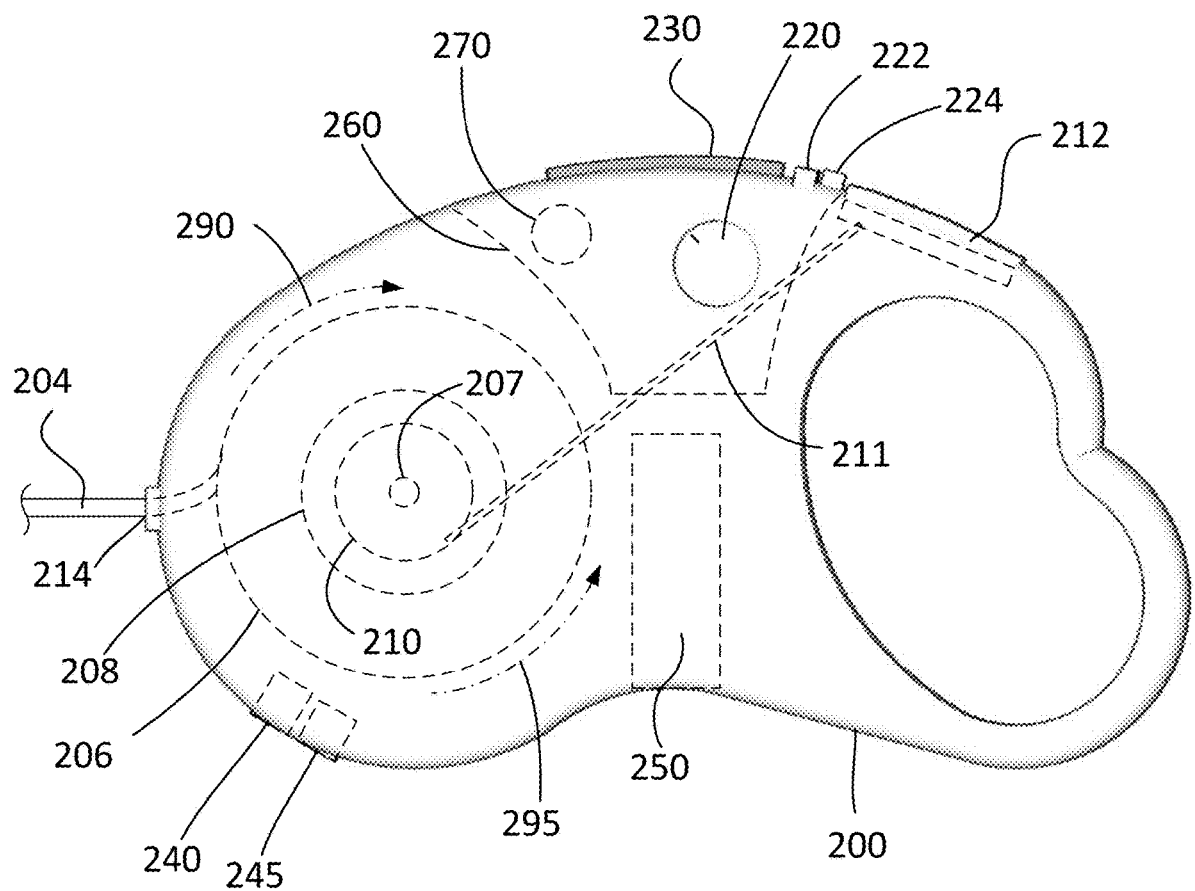
FIG. 2 is a side view of an environmentally aware pet leash consistent with certain embodiments of the present invention.

Turning now to FIG. 2, this figure depicts a side view of the housing 200 with some internal details shown. The spool 206 is located inside the front half of the housing 200 where it may rotate on the axle 207. The spool 206 may rotate in the first direction 290 under the influence of the spring 208 to pull the strap 204 back into the housing 200 through the strap aperture 214. The spool 206 may rotate in the second direction 295 when the strap 204 is pulled out of the housing 200. The brake 210 may prevent rotation of the spool 206 if activated by the brake handle 212 via the brake coupling 211. The laser pointer 240 and the infrared thermometer 245 at the bottom front of the housing 200 may be use to take a remote temperature measurement in front of the pet. The one or more batteries 250 may be located within the housing 200. As a non-limiting example, the one or more batteries 250 may be located at the bottom center of the housing 200. The control electronics 260 may be located within the housing 200 at a location where the control electronics 260 may interface with the power control 220, the operator display 230, the laser control 222, the backlight control 224, and other operator controls. The audio transducer 270 may be located on the control electronics 260 at a location where it is possible to hear the audio transducer 270 from outside of the housing 200.

Figure 3:
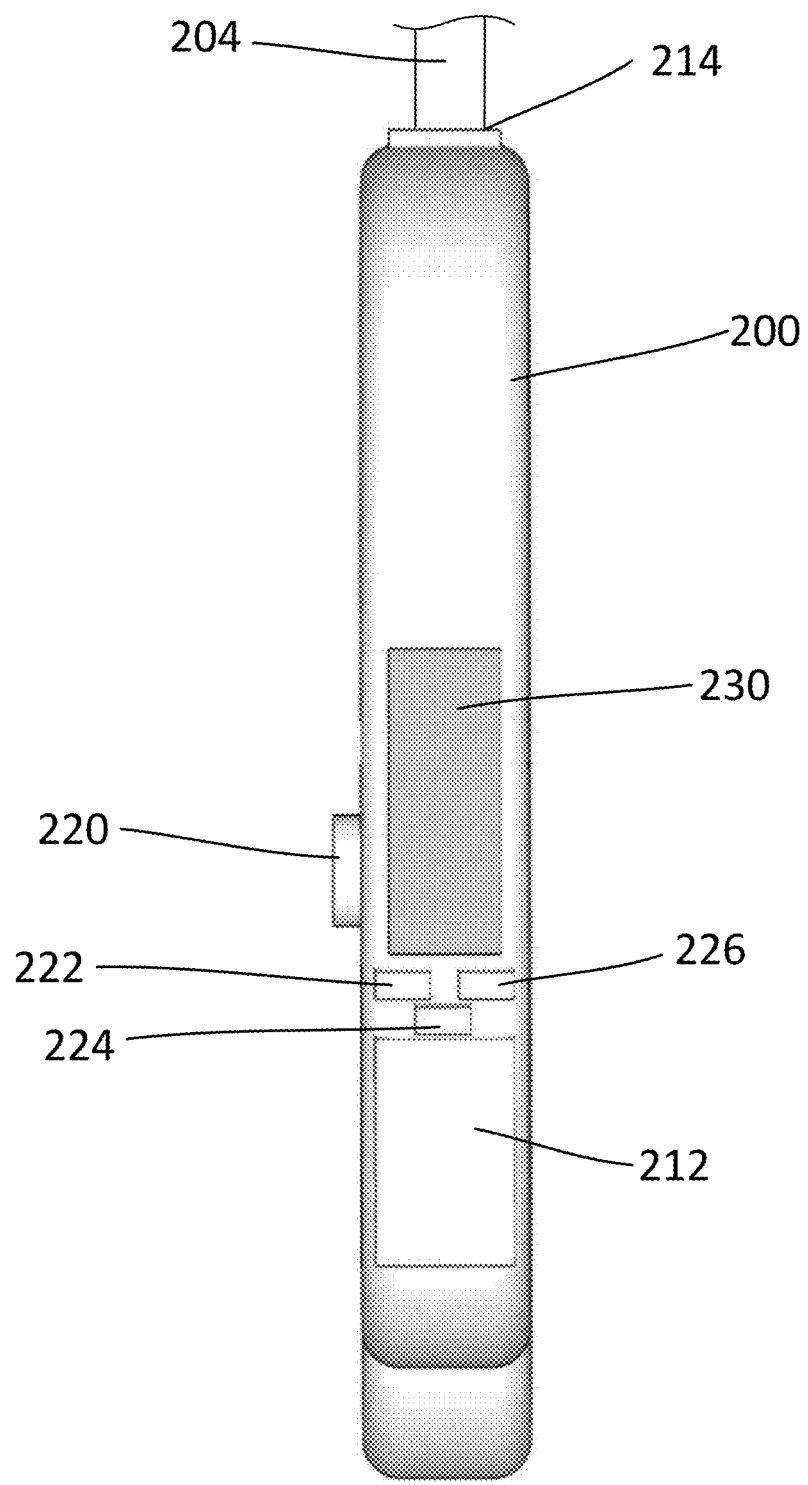
FIG. 3 is a top view of an environmentally aware pet leash consistent with certain embodiments of the present invention.

Turning now to FIG. 3, this figure depicts a top view of the housing 200 showing the locations of the operator display 230, the laser control 222, the units control 226, the backlight control 224, the power control 220, and the brake handle 212. The strap 204 may also be seen emerging from the strap aperture 214 at the front of the housing 200.

Figure 4:
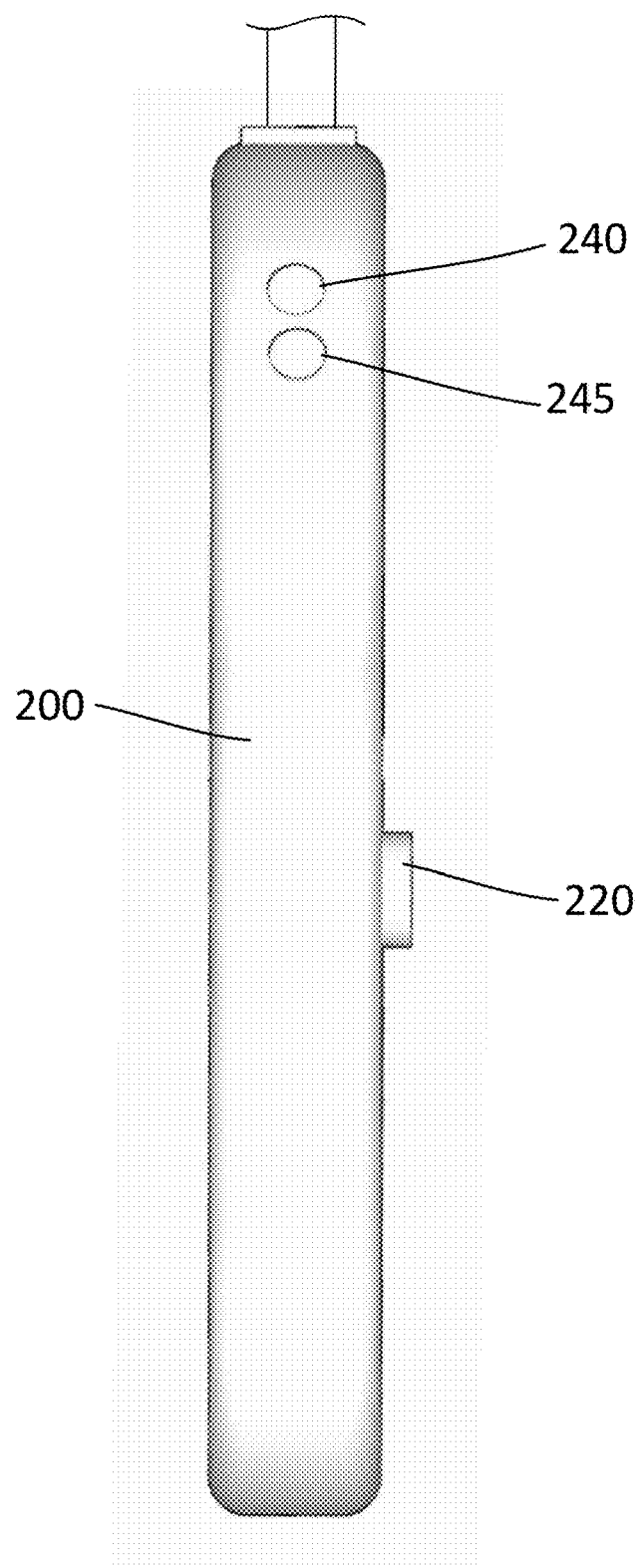
FIG. 4 is a bottom view of an environmentally aware pet leash consistent with certain embodiments of the present invention.

Turning now to FIG. 4, this figure depicts the bottom of the housing 200 showing the location of the laser pointer 240 and the infrared thermometer 245. The power control 220 can also be seen on the side of the housing 200.

Figure 5:
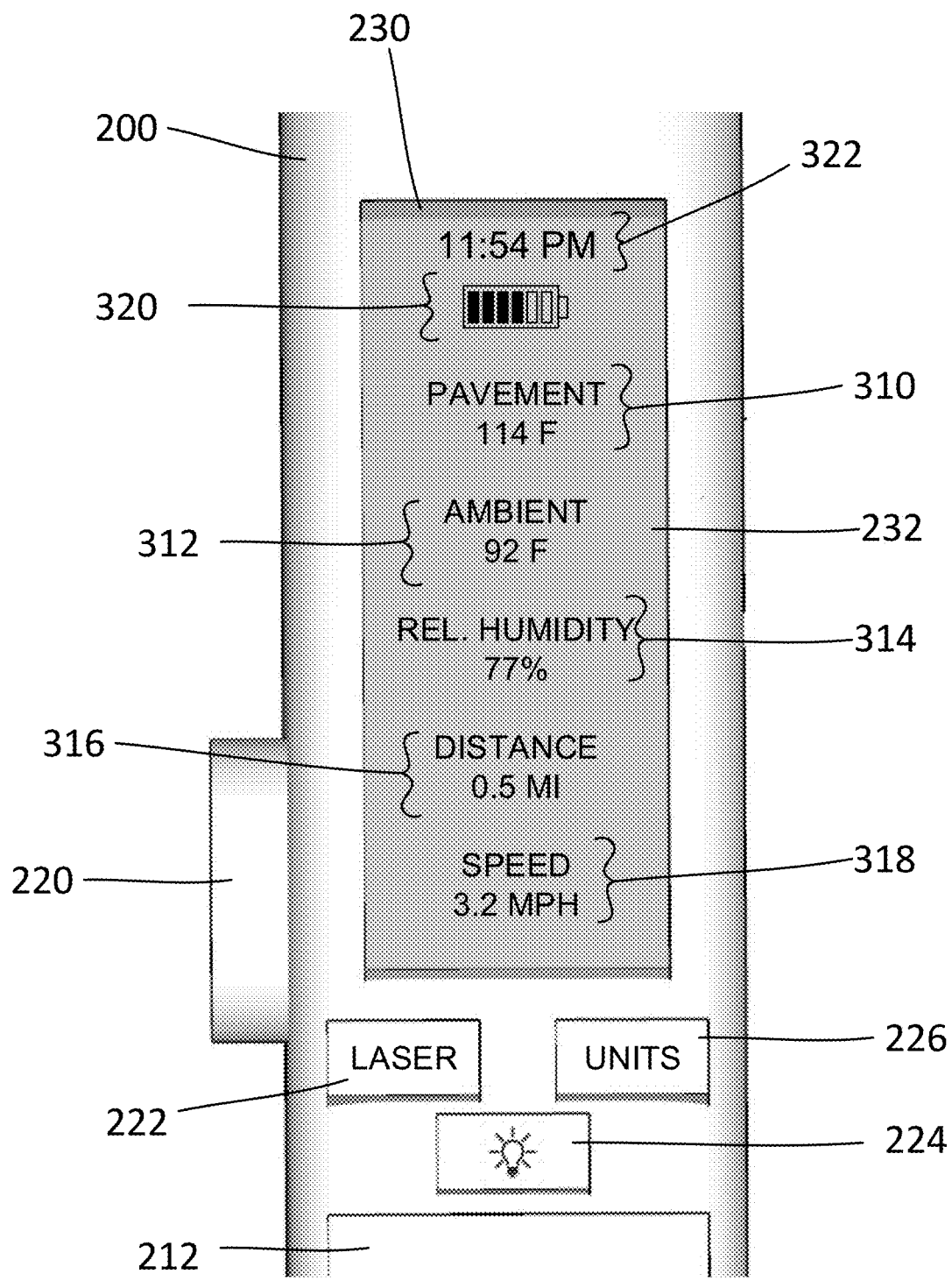
FIG. 5 is a detail view illustrating the operator display of an environmentally aware pet leash consistent with certain embodiments of the present invention.

Turning now to FIG. 5, this figure depicts details around the operator display 230. The operator display 230 may be located on the top of the housing 200 above the brake handle 212, the laser control 222, the units control 226, and the backlight control 224. Messages are shown on the operator display 230 as non-limiting examples. The specific format, text, imagery, message selection, message content, and placement of messages may be different on other embodiments. The time of day message 322 and the battery charge level message 320 are shown at the top of the operator display 230. The pavement temperature message 310, the ambient temperature message 312, and the ambient relative humidity message 314 are shown below the time of day message 322. The travel distance message 316 and the walking speed message 318 are shown at the bottom of the operator display 230. The backlight 232 behind the operator display 230 may be illuminated at night. The power control 220 can also be seen on the side of the housing 200.

Figure 6:
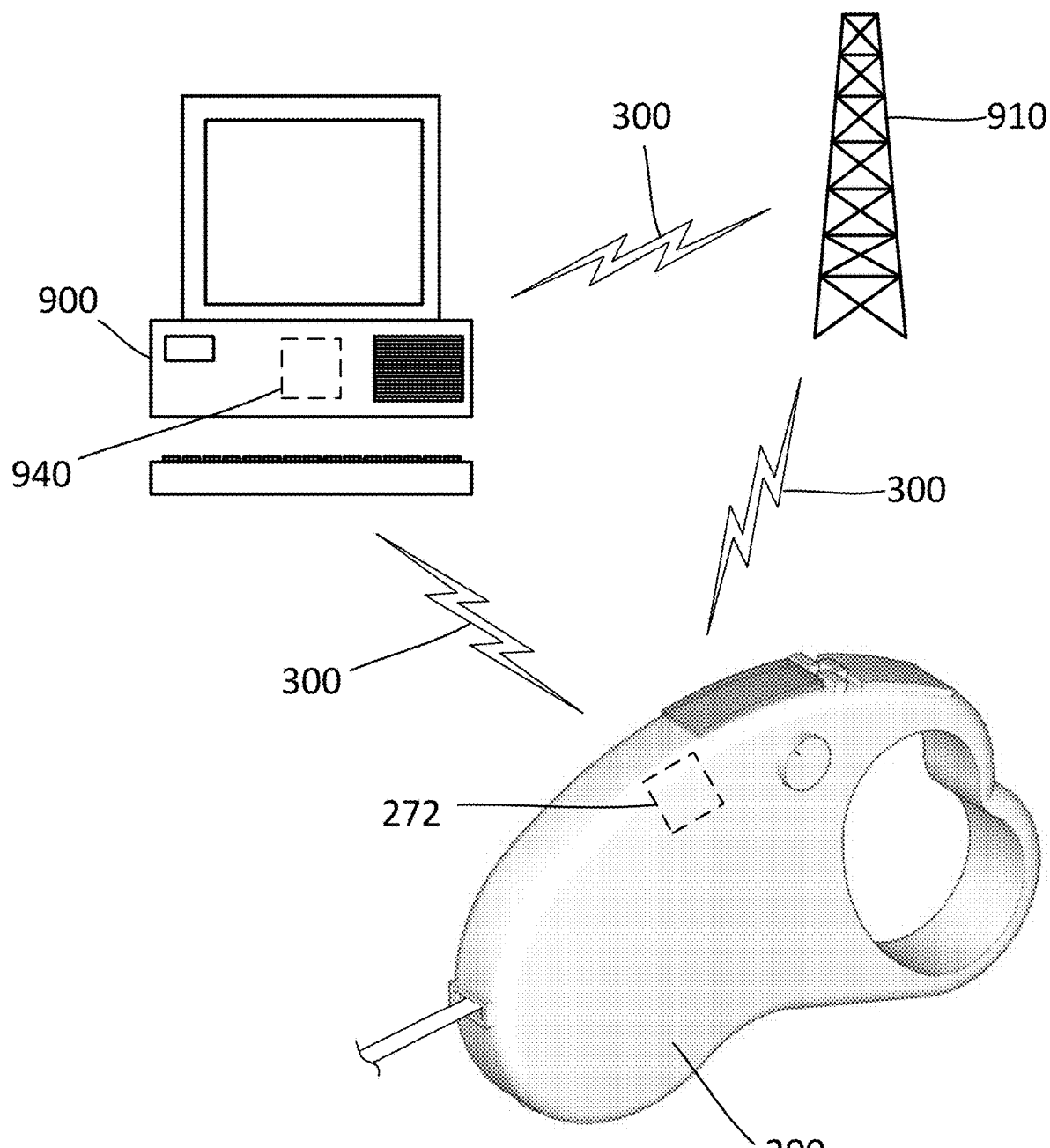
FIG. 6 is a detail view illustrating communication paths between an environmentally aware pet leash and a remote computer consistent with certain embodiments of the present invention.

Turning now to FIG. 6, this figure depicts details of communication between the transceiver 272 and the remote computer 900. The transceiver 272 located within the housing 200 may exchange the wireless messages 300 directly with the remote computer 900 or indirectly by passing the wireless messages 300 through the network 910. The software 940 running on the remote computer 900 may collect information regarding the walk, may determine the current location of the pet, may monitor the alert conditions that occur during the walk, or combinations thereof.

Figure 7:
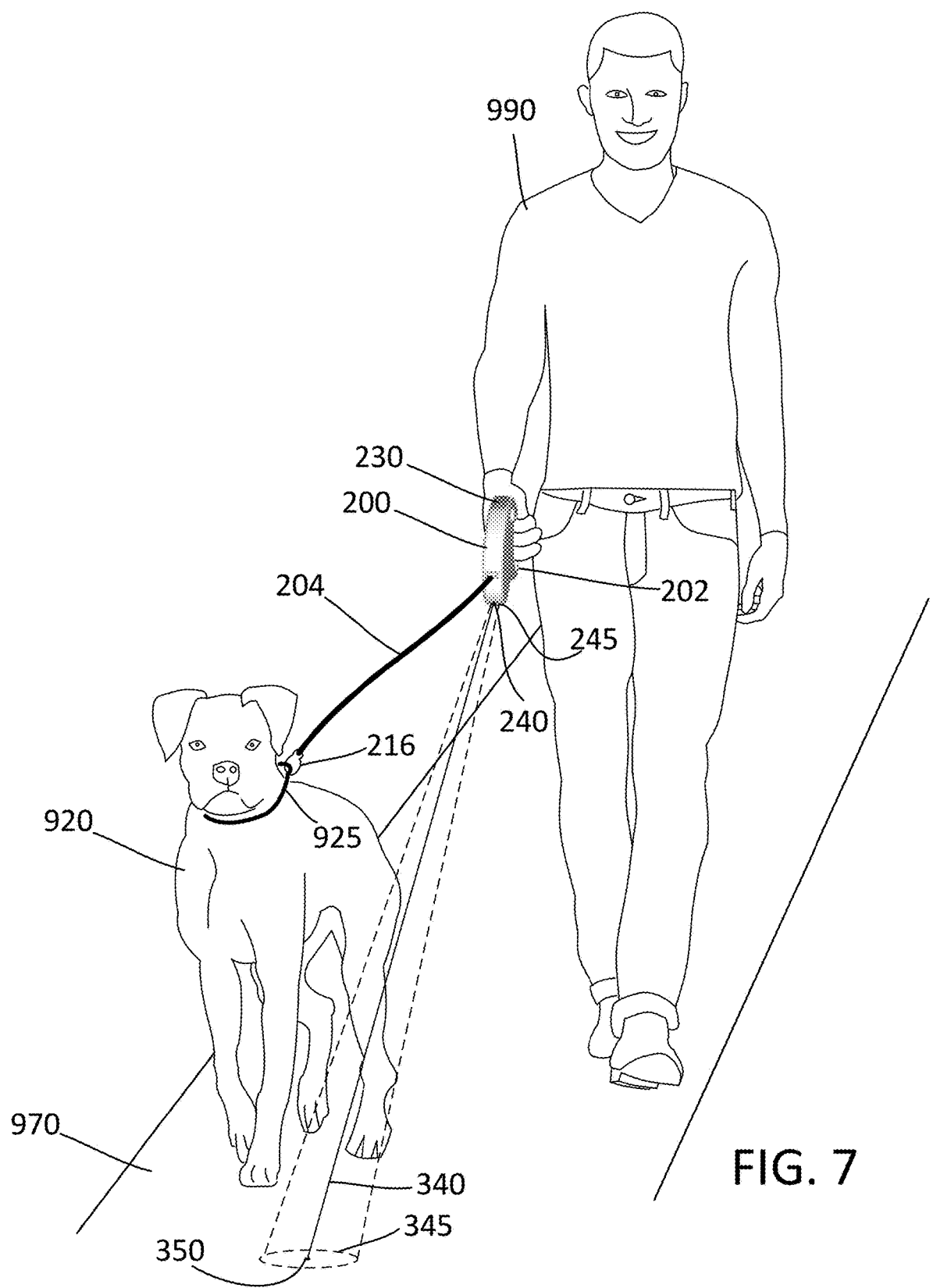
FIG. 7 is an in-use view of an environmentally aware pet leash consistent with certain embodiments of the present invention.

Turning now to FIG. 7, this figure depicts use of the invention. The user 990 has coupled the snap hook 216 to the pet collar 925. The strap 204 running from the snap hook 216 to the housing 200 limits the distance that the pet 920 may wander from the user 990. The user 990 grasps the grip 202 of the housing 200 to maintain control of the pet 920. The laser pointer 240 projects the laser beam 340 onto the pavement to produce the visible spot 350. The visible spot 350 shows the user 990 the location of the temperature measurement area 345 where the infrared thermometer 245 will measure the walking surface temperature, where the walking surface may be any of pavement, asphalt, concrete, composite materials, wooden planking, clay, grass, open soil, or any other surface upon which a pet would walk when outside with the owner of the pet. The walking surface temperature may be displayed on the operator display 230 where the user 990 can monitor it. The user 990 may choose to avoid certain walking surfaces if the indicated temperature is too high.

Figure 8:
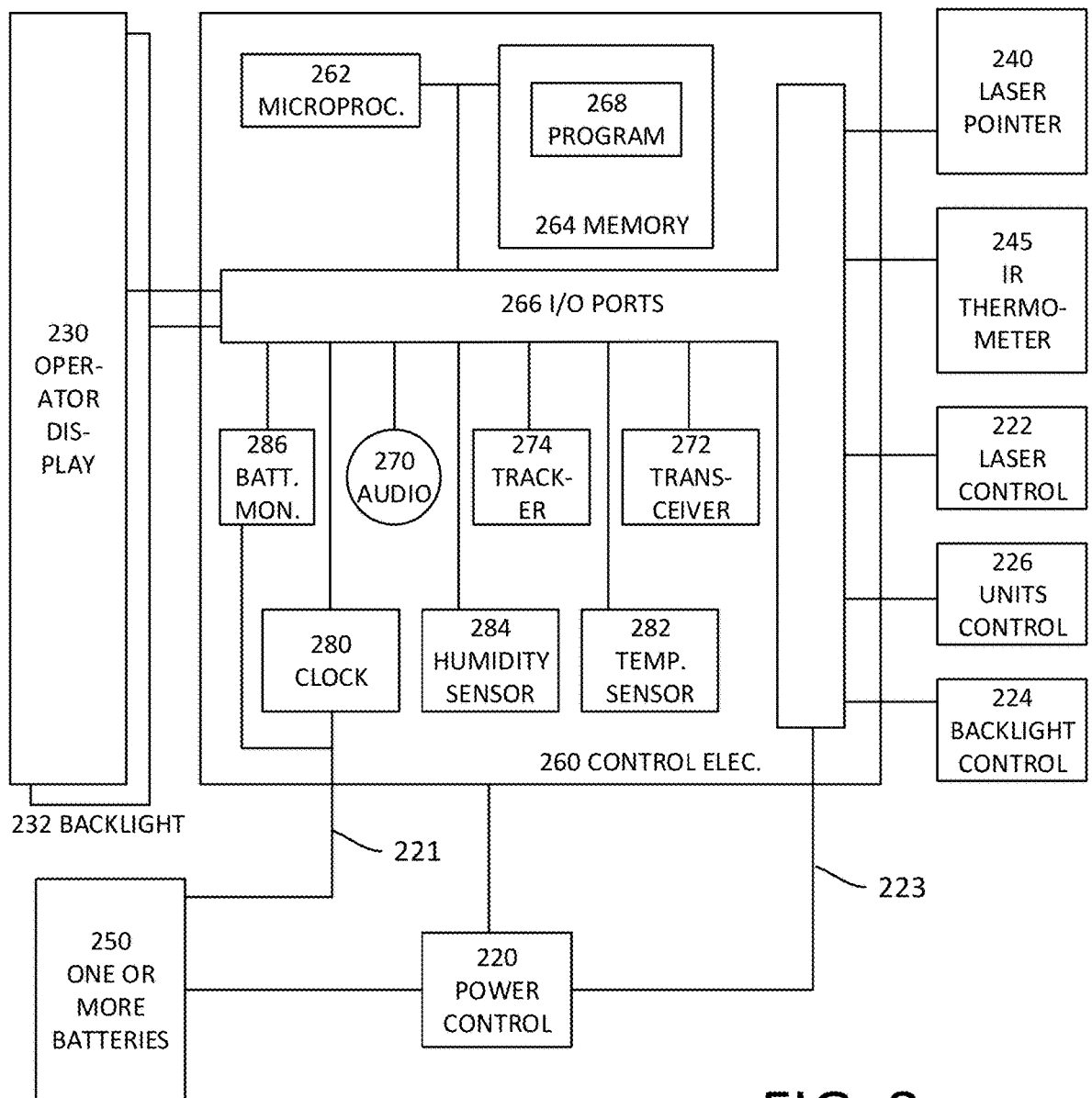
FIG. 8 is a block diagram of the control electronics consistent with certain embodiments of the present invention.

Turning now to FIG. 8, this figure depicts a block diagram of elements comprising the control electronics 260. In some embodiments, the control electronics 260 may comprise the microprocessor 262, the memory 264, and the one or more I/O ports 266. The memory 264 may contain the program 268 that determines the sequence and timing of the microprocessor 262. The microprocessor 262 may utilize the one or more I/O ports 266 to communicate with the hardware elements. The microprocessor 262 may read the backlight control 224 via the one or more I/O ports 266 to determine whether the backlight 232 should be turned on or off. The microprocessor 262 may read the laser control 222 to determine whether the laser pointer 240 should be turned on or off. The microprocessor 262 may read the units control 226 to determine the correct measurement units to report on the operator display 230. The microprocessor 262 may communicate with the infrared thermometer 245, the ambient temperature sensor 282, and the ambient relative humidity sensor 284 to determine the environmental conditions. The microprocessor 262 may communicate with the real time clock 280 to assess time and intervals and may communicate with the battery monitor 286 to assess usage of the one or more batteries 250. The microprocessor 262 may play sounds through the audio transducer 270 to indicate that the alert condition exists. The microprocessor 262 may monitor distances or location by communicating with the tracker 274. The microprocessor 262 may exchange information with a remote system by passing wireless messages via the transceiver 272. Power may be applied to or removed from the control electronics 260 by the power control 220. In some embodiments, a volume level input 223 may also be provided from the power control 220.

While certain illustrative embodiments have been described, it is evident that many alternatives, modifications, permutations and variations will become apparent to those skilled in the art in light of the foregoing description.

What is claimed is:

1. An environmentally aware pet leash device comprising:
   a housing enclosing at least a spool, control electronics, a laser pointer, an infrared thermometer, and an operator display;
   where a snap hook removably couples to a pet collar;
   where the laser pointer is configured to project a laser beam at a walking surface to produce a visible spot;
   where the infrared thermometer is configured to measure the temperature of the walking surface within a temperature measurement area where the infrared thermometer is aimed;
   where the control electronics are configured to receive a walking surface temperature from the infrared thermometer, forms a walking surface temperature message that includes the pavement temperature, and display the walking surface temperature message on the operator display.

2. The environmentally aware pet leash according to claim 1,
   where the environmentally aware pet leash further comprises a plurality of environmental sensors;
   where the control electronics is configured to receive environmental measurements from the plurality of environmental sensors;
   where the control electronics is configured to form environmental messages that include the environmental measurements;
   where the control electronics is configured to display the environmental messages on the operator display.

3. The environmentally aware pet leash according to claim 2,
   where the plurality of environmental sensors comprise an ambient temperature sensor or an ambient relative humidity sensor;
   where the environmental measurements comprise an ambient air temperature or an ambient relative humidity;
   where the environmental messages comprise an ambient temperature message or an ambient relative humidity message.

4. The environmentally aware pet leash according to claim 3,
   where the control electronics comprises a transceiver;
   where the control electronics are configured to exchange wireless messages with a remote computer via the transceiver;
   where the wireless messages are configured to convey the environmental measurements or an alert condition.

5. The environmentally aware pet leash according to claim 1,
   where the control electronics comprises a tracker;
   where a tracker is configured to determine a travel distance or a location of the environmentally aware pet leash.

6. The environmentally aware pet leash according to claim 5
   where the control electronics is configured to convey the travel distance or the location of the environmentally aware pet leash to the remote computer via the transceiver.

* * * * *